April 6, 1943.  G. BELLOWS, JR  2,315,923
ELECTRIC CONTROL SYSTEM AND APPARATUS
Filed Jan. 14, 1942
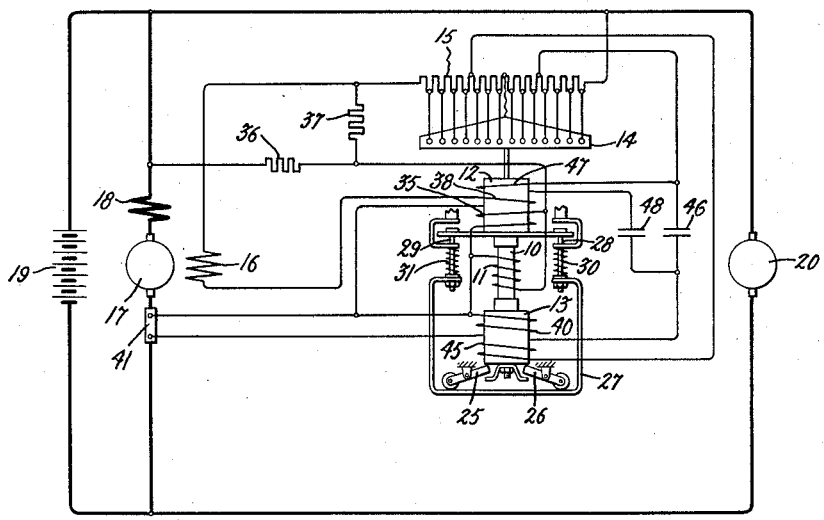
Inventor:
Guy Bellows Jr.,
by Harry E. Dunham
His Attorney.

Patented Apr. 6, 1943

2,315,923

UNITED STATES PATENT OFFICE 2,315,923

ELECTRIC CONTROL SYSTEM AND APPARATUS

Guy Bellows, Jr., Erie, Pa., assignor to General Electric Company, a corporation of New York Application January 14, 1942, Serial No. 426,732

12 Claims. (Cl. 171—312)

My invention relates to electric control systems and apparatus and more particularly to new and improved anti-hunt means for electric regulators of the dynamic or floating type. The invention is particularly applicable to voltage regulating systems of the variable resistance type, and has for its object the provision in such a system of a new and improved dynamic regulator which shall be simple and rugged in construction and highly sensitive in operation.

It is well known that in order to prevent overshooting in a dynamic or floating type of electric regulator it is necessary to provide stabilizing or anti-hunt means. For this purpose it is common to use one or more windings arranged to act upon the floating element of the regulator in such directions and at such times as to oppose excessive movements of the element. The current in such a stabilizing winding must be in such time phase with respect to the actuating current that it does not oppose normal movements of the regulator element and thereby make the regulator sluggish in its action, but does resist excessive movements or "overshooting." A delayed transient current in the stabilizing winding will have the desired effect without appreciably affecting the primary response of the regulator. By my invention simple means are provided for introducing such a delayed transient current which is in proper time phase with respect to the actuating current.

A further problem is introduced where a current limit feature is included with the regulator. If a separate current limit element is used such element may require an anti-hunt or stabilizing winding of its own. The use of an anti-hunt coil on a current limit element as well as an anti-hunt coil on the voltage responsive element introduces a second time phase problem, since it becomes necessary to determine the proper moment for the introduction of the transient impulse into the current element with respect to the actuating current of that element. While the anti-hunting current impulses for the voltage and current elements of the regulator must each lag the actuating currents on their respective elements by independently predetermined time intervals, there is a substantially fixed phase relation between the transient current impulses on the voltage and current elements of the regulator. This relation depends upon the relative time constants of the actuating coils and their connected circuits for the two floating elements of the regulator. My invention also provides simple and dependable means for timing, with respect to each other, the anti-hunt currents in the current and voltage elements of a regulator having joint or successive current and voltage response.

Accordingly, it is a primary object of my invention to provide new and improved stabilizing or anti-hunt means for an electric regulating system of the dynamic resistance control type.

It is another object of my invention to provide means for timing a transient stabilizing current impulse in the floating element of a dynamic type voltage regulator.

It is still another object of my invention to provide means for timing the anti-hunt impulses in the several elements of an electric regulator having joint or several voltage and current response.

My invention is particularly applicable to resistance regulating systems comprising a regulator of the dynamic type such as that shown in Patent 2,064,621, issued December 15, 1936, to J. W. McNairy. In such systems a variable resistor connected in series circuit relation with the shunt field of a direct current dynamo-electric machine is controlled by a dynamic regulator provided with one floating element carrying an actuating coil energized in response to the machine voltage and preferably with a second floating element carrying an actuating coil energized in accordance with the current through the machine. In order to provide an anti-hunt current impulse for the floating current responsive element of the regulator I find that a stabilizing winding on the current responsive element connected to be responsive to a change in current in the shunt field circuit is suitable. Due to the fact that the actuating coil on the voltage responsive floating element of the regulator inherently has a larger time constant and therefore slower response than the actuating coil on the current responsive regulator element, I have found that particularly advantageous results are obtained by energizing a stabilizing winding upon the voltage element immediately subsequent to the decay of the anti-hunt impulse on the current element.

In order to provide transient anti-hunt current impulses in the time phase described I connect the stabilizing winding of the current element across a portion of the shunt field resistor in series with a condenser and connect the anti-hunt coil on the voltage element of the regulator across the aforesaid condenser in series with a second condenser. The presence of the condensers prevents the flow of any steady state current through the stabilizing windings.

For a fuller understanding of my invention and a further appreciation of its objects and advantages reference should now be had to the following detailed specification taken in connection with the accompanying drawing, the single figure of which is a schematic circuit diagram of a voltage regulating system and device embodying my invention.

In the drawing I have illustrated schematically a voltage regulator of the type shown at Figs. 6 and 7 of Patent 2,064,621 to McNairy above. The structural details of such a relay are adequately described in the patent. Briefly, the regulator comprises a magnetizable field structure 10 arranged to be magnetized beyond its saturation point by a main field exciting winding 11. As illustrated in the patent the field structure defines two air gaps within each of which is suspended a cup-shaped floating element. The strong and substantially constant magnetic field across the air gaps is in a radial direction with respect to the cup-like moving elements 12 and 13. The moving element 12 is a floating voltage responsive element and is connected directly to a contact bar 14 which, when moved in a downward direction, gradually inserts the sections of a variable resistor 15 in series circuit relation with the shunt field winding 16 of a direct current generator 17.

In the embodiment of the invention chosen for illustration, the direct current generator 17 is shown provided with a commutating field winding 18 and is connected to charge a battery 19 and to supply electric current to an external load such as a motor 20 forming part of the air conditioning system of a railway car or other vehicle. Since the battery, generator armature and load connections are conventional, the usual line switches and reverse current relay have been omitted from the drawing, but it will be understood that preferably such apparatus is provided.

Preferably, also, the voltage regulator is further provided with the current limit moving element 13 which is connected to the moving element 12 by a one-way linkage so arranged that a downward but not an upward force may be exerted upon the moving element 12 and the contact bar 14 by the current limit element 13. Ordinarily, the current limit element 13 is spring biased downwardly against a fixed stop where it is out of engagement with the one-way connecting linkage. Upon the passage of a predetermined maximum value of current through the generator 17 the current limit movable element 13 will move upward to engage a pair of levers 25, 26 which are centrally pivoted at fixed points and have rolling contact at one end with a U-shaped yoke 27. The upper end of the yoke 27 is connected by a pair of bolts 28, 29 to the voltage responsive floating element 12 and to the lower ends of a pair of tension springs 30, 31. The upper ends of the tension springs 30, 31 are connected to the regulator frame thereby to bias the floating voltage responsive element 12 and the yoke 27 upwardly.

The floating voltage element 12 carries a shunt coil 35, which is connected across the terminals of the generator 17 in series with a resistor 36. The regulator field exciting winding 11 is connected in parallel circuit relation to the floating shunt coil 35.

Preferably the floating shunt coil 35 is also connected across the terminals of the shunt field winding 16 in series with a relatively large resistor 37 in order to provide an anti-hunt action described in the above McNairy patent. By this arrangement the energization of the floating shunt coil 35 is changed in accordance with the rate of change of current of the shunt field winding 16. Upon any change of current in the shunt field winding 16 an inductive voltage is set up across the terminals of the winding 16 tending to maintain the field flux. This inductive voltage will vary the currents through the shunt field winding 16 and the floating shunt coil 35, its effect on the coil 35 tending to prevent hunting of the moving element 12. For example, if the current in the shunt field winding 16 is reduced, an inductive voltage tending to maintain the field flux will be set up, and this inductive voltage as applied to the winding 35 will oppose the normal current flow through the winding 35 thereby reducing the current in the winding 35. The reduced current in the winding 35 tends to limit downward movement of the voltage element 12 thereby to prevent further increase of the shunt field resistance 15. Thus, the induced volage tends to prevent overshooting of the regulator upon an increase in machine voltage and consequent downward movement of the voltage element 12. A similar action results upon a decrease in machine voltage.

To counteract the inherent proportional characteristic of the floating shunt coil 35 in a magnetic field of constant strength the floating shunt element 12 is provided with a second moving coil 38 through which the shunt field current itself passes in such a direction as to set up a flux opposing the flux established by the floating shunt coil 35. If the shunt coil 35 alone were present its vertical position in the magnetic field would be directly proportional to the voltage of the generator 17. Thus, if the voltage of the generator tended to rise as due to an increase in speed, necessitating an increase in the resistance of the resistor 15, the voltage would have to remain slightly above normal in order to maintain the moving element 12 slightly below its normal position so that the resistance of the resistor 15 might remain slightly greater than normal, thereby to reduce the machine voltage. With the windings 35 and 38 acting in opposition any increase in field current decreases the effect of the winding 35 and any decrease in field current increases the effect of the winding 35. In this way the control point of the regulator is reset by the winding 38 so that a more nearly constant voltage is maintained. For example, if the machine voltage increases so that the moving element 12 is drawn downwardly to increase the shunt field resistance and thereby to decrease the shunt field current and the machine voltage, the decreased shunt field current decreases the bucking effect of the coil 38. Thus the floating shunt coil 35 will have a greater effect for the same machine voltage and will be able to maintain the floating element 12 in a lower position without necessitating an increase in machine voltage.

In order to limit the load current to a predetermined maximum value the movable current limit element 13 carries a winding 40 connected across the terminals of a current shunt 41 which is in series with the armature of the direct current generator 17. In this manner the coil 40 carries a current proportional to the armature current of the generator 17. So long as the current in the winding 40 remains below a predetermined value the current limit element 13 does not move but remains biased downwardly against a fixed stop. Upon the occurrence of a current in excess of the predetermined value the current element 13 moves upwardly thereby to exert a force upon the yoke 27 tending to draw the moving element 12 and the contact bar 14 downwardly.

It has been found that with the connections described the regulator is relatively unstable when acting under the control of the current limit element 13. This instability is particularly noticeable when the generator 17 is being brought up to speed, and is due not so much to an inherent instability of the regulator as to the instability of the generator when operating below the knee of its saturation curve. Since regulators of the type which I have described are designed particularly for application to axle-driven generators used to supply the lighting and air conditioning systems of railway cars and other rolling stock which operate at varying speed, it is particularly necessary that such a condition of instability be counteracted. I have found that such a condition is satisfactorily overcome by providing the current limit element 13 with a stabilizing or anti-hunt winding 45 connected across two points of normally differing potential in the shunt field circuit of the direct current generator 17. As shown in the drawing, I choose to connect the coil 45 across a suitable number, for example about one-third, of the sections of the resistor 15 which are last to be cut in by the contact bar 14 as the generator voltage increases. In order that the anti-hunt winding 45 will carry a current only during changing current conditions in the shunt field circuit I connect in series with the coil 45 a condenser 46. The normal operating position of the regulator is such that at least some of the resistor sections across which the condenser 46 and winding 45 are connected are in the shunt field circuit thereby to provide a suitable voltage drop to charge the condenser 46.

It will be evident that so long as the current in the shunt field circuit of the generator 17 remains constant the voltage applied across the condenser 46 and the winding 45 will remain unchanged and that no current will flow in the winding 45. As soon as the contact bar 14 is moved in either direction to produce a change in the magnitude of current flowing in the shunt field circuit the change in current will result in a change in the voltage drop across the various sections of the resistor 15 and a consequent change in the voltage applied to the condenser 46 and the winding 45. Such a change in the voltage applied to the condenser will permit the flow of a transient current through the winding 45, thereby partially to discharge the condenser 46 or further to charge it depending upon the nature of the change in applied voltage. The transient current through the anti-hunt coil 45 will flow in a direction determined by the nature of the change in shunt field current, and the coil 45 is so wound that the transient current flowing tends to move the current limit element 13 in a direction opposite to the direction of movement which caused the change in shunt field current. Thus, if the regulator is acting under the control of the current limit coil 40, an increased load current will move the current limit element 13 upwardly thereby to move the contact bar 14 in a downward direction and increase the resistance in the shunt field circuit of the generator. As soon as the current of the shunt field circuit decreases a transient current flows through the anti-hunt winding 45 in a direction tending to move the current limit element downwardly and in opposition to the influence of the coil 40. Since the initial movement produced by the coil 40 must take place before any current surge in the shunt field circuit can occur to cause a flow of transient current through the anti-hunt winding 45, it will be evident that the influence of the anti-hunt winding 45 is not felt until after the initial movement of the current limit element 13. I have found that when the anti-hunt winding 45 is connected for direct response to a current surge in the shunt field circuit the time delay between the initial impulse in the current coil 40 and the anti-hunt impulse in the coil 45 is suitable to substantially preclude hunting operation of the regulator under the control of the current limit element 13. In this respect it will be noted that the time constant $L/R$ of the current coil 40 is relatively low and that accordingly the anti-hunt winding 45 is connected for instantaneous response to any current surge in the relatively inductive shunt field circuit of the generator.

It has also been found that upon the sudden application of a substantial load current less than the current limit cut-in value the regulator has a decided tendency to hunt even though solely under the control of the voltage element 12. To counteract this tendency I provide a second anti-hunt winding 47 upon the floating voltage element 12 energized across the terminals of the capacitor 46 in series with a second capacitor 48. With this arrangement I obtain in the winding 47 a second transient current impulse in response to any change of current in the shunt field circuit, but the impulse in the winding 47 is delayed by a predetermined interval with respect to the impulse in the winding 45. As previously explained, any current surge, whether an increase or a decrease of current, in the shunt field circuit, will produce a change in the charge of the capacitor 46 accompanied by a transient flow of current through the winding 45. During this transient flow of current through the winding 45 the condenser 46 acts as a short circuit across the parallel connected circuit comprising the anti-hunt winding 47 and the condenser 48. When the voltage across the condenser 46 attains its new steady state value, however, a consequent change will occur in the charge of the condenser 48 and any such change in charge will be accompanied by a transient flow of current through the anti-hunt winding 47. The transient flow of current through the winding 47 is in a direction determined by the nature of the change in charge upon the condenser 46, and the winding 47 is so arranged that the flow of current therethrough tends to oppose the movement of the floating element 12 which initially produced the change in generator shunt field current.

The reason for the time delay between the energization of the stabilizing winding 45 and the stabilizing winding 47 will be evident when it is pointed out that the time constant of the floating shunt coil 35 is inherently greater than the time constant of the floating current coil 40. Thus, an anti-hunt impulse on the voltage end of the regulator must be impressed at a later time than an anti-hunt impulse on the current end of the regulator. It has been found that the relative time constants of the voltage and current coils and their connected circuits are ordinarily such that the time delay produced by the condenser 46 is ordinarily of the correct order of magnitude to substantially completely stabilize the voltage end of the regulator.

It will be noted that as the generator voltage increases and the moving element of the regulator moves downward, the number of resistor sections connected across the condenser 46 and winding 45 is increased. As this takes place the shunt field current decreases, so that, the stabilizing voltage drop may be increased or decreased or kept substantially constant, as desired, as the generator voltage increases. Ordinarily it is desirable to increase the stabilizing voltage drop and the stabilizing effect slightly as the generator voltage increases.

It is believed that the mode of operation of my new and improved voltage regulating system as a whole will be evident to those skilled in the art after full consideration of the above description of the various parts of the regulator and their respective functions.

While I have shown only a preferred embodiment of my invention by way of illustration, many other modifications will occur to those skilled in the art, and I therefore wish to have it understood that I intend by the appended claims to cover all such modifications as fall within the true spirit and scope of my invention.

What I claim as new and desire to secure by Letters Patent of the United States is:

1. In an electric control system, the combination comprising a direct current generator having a field winding, a variable resistor connected in series circuit relation with said field winding to complete an energizing circuit for said generator, a condenser having terminals connected across points of normally differing potential in said energizing circuit, a dynamic regulator having a voltage responsive floating element arranged to control the resistance of said resistor thereby to regulate the voltage of said generator, a stabilizing winding on said floating element, and a second condenser connected in series with said stabilizing winding across the terminals of said first condenser, whereby said stabilizing winding is transiently energized through said second condenser upon any change in the charge upon said first condenser.

2. In an electric control system, the combination comprising a direct current generator having a field winding, a variable resistor connected in series circuit relation with said field winding to complete an energizing circuit for said generator, a dynamic regulator comprising separate voltage responsive and current responsive floating elements arranged to control the resistance of said resistor thereby to regulate the voltage and current of said generator, a stabilizing winding on each of said floating elements, means for transiently energizing the stabilizing winding on said current responsive element in response to changes in current flowing in said energizing circuit, and time element means for transiently energizing the stabilizing winding on said voltage element in response to current impulses in the stabilizing winding on said current element.

3. In an electric control system, the combination comprising a direct current generator having a shunt field winding, a variable resistor connected in series circuit relation with said shunt field winding to complete a shunt field circuit for said generator, a dynamic regulator comprising separate voltage responsive and current responsive floating elements arranged to control the resistance of said resistor thereby to regulate the voltage and current of said generator, a stabilizing winding on each of said floating elements, means for transiently energizing said stabilizing windings in response to changes in the current flowing through said shunt field circuit, and time element means for disabling the stabilizing winding on said voltage responsive element while the stabilizing winding on said current responsive element is energized.

4. In an electric control system, the combination of a direct current generator having a shunt field winding, a variable resistor connected in series circuit relation with said shunt field winding to complete a shunt field circuit for said generator, a dynamic regulator comprising separate voltage responsive and current responsive floating elements arranged respectively to regulate the voltage and to limit the current of said generator, a stabilizing winding upon each of said floating elements, a first condenser connected in series circuit relation with the stabilizing winding on said current responsive element across points of normally differing potential in said shunt field circuit thereby to provide a transient stabilizing current impulse in response to changes in the current flowing through said shunt field circuit, and a second condenser connected in series circuit relation with the stabilizing winding on said voltage responsive element across the terminals of said first condenser thereby to provide a transient stabilizing current impulse upon said voltage responsive element in lagging time relation with respect to said first current impulse.

5. Apparatus for controlling an electric circuit comprising a magnetizable field structure having at least two air gaps, means for establishing a substantially constant magnetic flux across said air gaps, a floating control element suspended in each of said two air gaps, one of said elements carrying a coil energized in response to the current in said electric circuit and the other of said elements carrying a coil energized in response to the voltage of said electric circuit, a stabilizing winding on each of said control elements, means for transiently energizing a first of said stabilizing windings to prevent hunting of the floating control element carrying said current responsive coil, and time element means for transiently energizing the other of said stabilizing windings in response to a current impulse in said first stabilizing winding.

6. Apparatus for controlling an electric circuit comprising a magnetizable field structure having at least two air gaps, means for establishing a substantially constant magnetic flux across said air gaps, a floating control element suspended in each of said two air gaps, an actuating coil mounted upon each of said floating elements, one of said actuating coils having a relatively small time constant and the other of said coils having a relatively large time constant, a stabilizing winding carried by each of said floating elements, means for transiently energizing the stabilizing winding associated with said one actuating coil to provide stabilizing current impulses in lagging time relation with respect to actuating current impulses in said coil, and time element means providing stabilizing current impulses in said other stabilizing winding in predetermined lagging time relation with respect to the current impulses of the first of said stabilizing windings, said predetermined time relation being determined in accordance with the relation of the time constants of said actuating coils.

7. Apparatus for controlling a direct current electric circuit comprising a magnetizable field structure having at least two air gaps, means for establishing a substantially constant flux across said air gaps, a floating control element suspended in each of two air gaps, an actuating coil of relatively low resistance mounted upon one of said floating elements, said actuating coil being adapted to carry a current proportional to the current in said electric circuit, a second actuating coil mounted upon the other of said floating elements, said second actuating coil having a relatively high resistance and inductance and being adapted to carry a current proportional to the voltage of said electric circuit, a stabilizing winding carried by each of said floating elements, means including a condenser connected in series circuit relation with the stabilizing winding associated with the first of said actuating coils transiently to energize said stabilizing winding, and means including said first condenser and a second condenser connected in series circuit relation with the other of said stabilizing windings for transiently energizing said other stabilizing winding, said first condenser disabling said second disabling winding during energization of said first stabilizing winding.

8. In an electric control system, the combination comprising a direct current generator having a shunt field winding, a variable resistor connected in series circuit relation with said shunt field winding to complete a shunt field circuit for said generator, a dynamic regulator comprising separate voltage responsive and current responsive floating elements arranged to control the resistance of said resistor thereby to regulate the voltage and the current of said generator, a stabilizing winding on each of said floating elements, means for transiently energizing said stabilizing windings in response to changes in the current flowing through said shunt field circuit, said means including a condenser connected in series circuit relation with the stabilizing winding upon said current responsive floating element and in parallel circuit relation with the stabilizing winding mounted upon said voltage responsive floating element for disabling the stabilizing winding on said voltage responsive element while the stabilizing winding on said current responsive element is energized.

9. A regulating system comprising an electric circuit including an impedance and means for supplying electric current to said impedance, regulating means responsive to a function of the current in said impedance for controlling said current to maintain said function at a substantially constant value, a condenser having terminals connected across points of normally differing potential upon said impedance, a stabilizing winding operable in conjunction with said regulating means to tend to oppose any change initiated by said regulating means, and a second condenser connected in series circuit relation with said stabilizing winding across the terminals of said first condenser, whereby said stabilizing winding is transiently energized through said second condenser upon any change in the charge upon said first condenser.

10. In an electric control system, the combination comprising a dynamo electric machine having a field winding, regulating means responsive to an electrical characteristic of said dynamo electric machine for controlling the current in said field winding to maintain said characteristic substantially constant, a condenser, means for imposing upon said condenser a potential proportional to the voltage drop across said field winding, a stabilizing winding operable in conjunction with said regulating means and arranged to tend to oppose any change initiated by said regulating means, and a second condenser connected in series circuit relation with said stabilizing winding across the terminals of said first condenser, whereby said stabilizing winding is transiently energized through said second condenser upon any change in the charge upon said first condenser.

11. In an electric control system the combination comprising a dynamo electric machine having a field winding, regulating means comprising a plurality of elements separately responsive to different electrical characteristics of said dynamo-electric machine for controlling the current of said field winding thereby to regulate said characteristics, a stabilizing winding operable in conjunction with each of said regulator elements, means for transiently energizing the stabilizing winding associated with one of said elements in response to changes in the current flowing in said field winding, and time element means for transiently energizing the stabilizing winding associated with the other of said elements in response to current impulses in the stabilizing winding associated with the first of said elements.

12. In an electric control system, the combination comprising a dynamo electric machine having a field winding, regulating means comprising a plurality of elements separately responsive to the voltage and current of said dynamo electric machine for controlling the flow of current through said field winding thereby to regulate the voltage and current of said dynamo electric machine, a stabilizing winding associated with each of said voltage and current responsive elements and arranged to oppose any change in the energization of said elements, means for transiently energizing said stabilizing winding in response to changes in the current flowing through said field winding, and time element means for disabling the stabilizing winding associated with said voltage responsive element while the stabilizing winding associated with said current responsive element is energized.

GUY BELLOWS, Jr.